(12) United States Patent
Shirakawa et al.

(10) Patent No.: US 6,407,900 B1
(45) Date of Patent: Jun. 18, 2002

(54) LIGHTNING PROTECTION SYSTEM FOR WIND POWER GENERATION INSTALLATION

(75) Inventors: Shingo Shirakawa, Hitachi; Seizo Nakano, Mito; Kazuo Suzuki, Hitachi, all of (JP)

(73) Assignees: Hitachi, Ltd., Tokyo; Hitachi Engineering & Services Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/526,459

(22) Filed: Mar. 16, 2000

(30) Foreign Application Priority Data

Mar. 17, 1999 (JP) ............................................. 11-072004

(51) Int. Cl.[7] ................................................. H02H 1/00
(52) U.S. Cl. ...................................................... 361/117
(58) Field of Search ........................... 361/56, 91, 111, 361/117, 126, 127, 128, 130

(56) References Cited

U.S. PATENT DOCUMENTS

| 4,447,738 | A | * | 5/1984 | Allison ........................ 290/44 |
| 4,587,592 | A | * | 5/1986 | Nakano et al. ............. 361/127 |
| 4,673,822 | A | * | 6/1987 | Kikuchi ....................... 290/44 |
| 5,574,613 | A | * | 11/1996 | Shirakawa et al. ......... 361/117 |

* cited by examiner

*Primary Examiner*—Matthew Nguyen
(74) *Attorney, Agent, or Firm*—Mattingly, Stanger & Malur, P.C.

(57) ABSTRACT

In a lightning protection system for a wind power generation installation, a conductor ring 16 is provided on a wind mill vane 1 and at a rotor casing 6 incorporating a wind power generator 3 a zinc oxide element 18 is provided so as to face the conductor ring 16 with a spark gap 17, thereby, if a lightning in winter season which causes to flow a large current for a long duration time hits the wind mill vane 1, the wind power generation installation is effectively protected.

5 Claims, 6 Drawing Sheets

LIGHTNING PROTECTION SYSTEM FOR WIND POWER GENERATION INSTALLATION

BACKGROUND OF THE INVENTION

1. Field of The Invention

The present invention relates to a lightning protecting system for a wind power generation installation.

2. Conventional Art

Conventionally, at a rotor casing which incorporates a wind power generator a lightning conductor is provided, and at the same time, in order to protect the wind power generator and a control unit thereof (herein below called inclusively as a wind power generation device) from a lightning hit on a wind mill vane made of a low resistance conductor, a lightning protection device is constituted while providing a spark ring on the wind mill vane and an opposing conductor thereto with a discharge gap.

Great many wind power generation installations are these days being built to obtain a clean energy and are also being planned. Since wind mills are generally built at high on a flat site with no obstacles, the wind mills likely suffer lightnings, therefore, it is necessary to take sufficient counter measures to such lightnings.

It is observed that with regard to lightnings in summer season, although the voltages of the lightnings are high, but the current value of the lightning impulse is not so high as well as the duration of the impulse current is comparatively short. Therefore, for the lightnings having such lightning impulse current, the installation can be sufficiently protected through spark discharges with the discharge gap.

However, with regard to lightnings in winter season, the current value of the lightning impulse is large and the duration time thereof is also long. Therefore, it was observed that if the lightning impulse current is large, an over voltage increases which likely damages the wind power generation device, in particular, electronic parts thereof.

SUMMARY OF THE INVENTION

In view of such problems, an object of the present invention is to provide a lightning protection system for a wind power generation installation which effectively protects a wind power generation device for lightnings having a large current value of lightning impulses as well as a large duration time.

Another object of the present invention is to provide a lightning arrester system for a multiplicity of wind mills disposed at one site which permits a cost reduction.

The present invention is characterized by providing a protection device with a lightning arrester constituted by a non-linear resistance body such as a zinc (ZnO) type lightning arrester, in place of a conventional protection device with a spark gap. A zinc oxide type lightning arrester exhibits such a voltage-current characteristic which shows a substantially constant electric field intensity (V/cm) with respect to a broad band of current density (A/cm$^2$). Namely, the zinc oxide type lightning arrester shows a proper protective characteristic and discharge current withstanding property in a medium electric field region in which an over voltage is applied as well as in a high electric field region which is affected by the inherent resistance of zinc oxide crystallines concerned.

The present invention is characterized by selecting, in particular, a non-linear resistance body having the above referred to characteristics and represented by a zinc oxide type element, and, specifically, provides the following devices.

The present invention provides a lightning protection system provided at a wind power generator in which wind mill vanes are rotated by wind force and electric power is generated by making use of the rotating force thereof, wherein at a rotor casing incorporating the wind power generator a non-linear resistance body is provided so as to face the wind mill vanes.

The present invention provides a lightning protection system provided at a wind power generator in which wind mill vanes are rotated by wind force and electric power is generated by making use of the rotating force thereof, wherein a conductor ring is provided on the wind mill vanes and at a rotor casing incorporating the wind power generator, a non-linear resistance body is provided so as to face the conductor ring with a gap.

The present invention provides a lightning protection system provided at a wind power generator in which wind mill vanes are rotated by wind force and electric power is generated by making use of the rotating force thereof, wherein at a rotor casing incorporating the wind power generator a zinc oxide type lightning arrester element is provided so as to face the wind mill vanes.

The present invention provides a lightning protection system provided at a wind power generator in which wind mill vanes are rotated by wind force and electric power is generated by making use of the rotating force thereof, wherein a conductor ring is provided on the wind mill vanes and at a rotor casing incorporating the wind power generator, a zinc oxide type lightning arrester element is provided so as to face the conductor ring with a gap.

The present invention provides a lightning protection system provided at a wind power generator in which wind mill vanes are rotated by wind force and electric power is generated by making use of the rotating force thereof, wherein, over a plurality of wind mills arranged in an array a lightning conductor is stretched and is earthed to the ground.

DETAILED DESCRIPTION OF THE PREFERRED EMBODIMENTS

Herein below, embodiments of the present invention will be explained with reference to the drawings.

Figure 1:
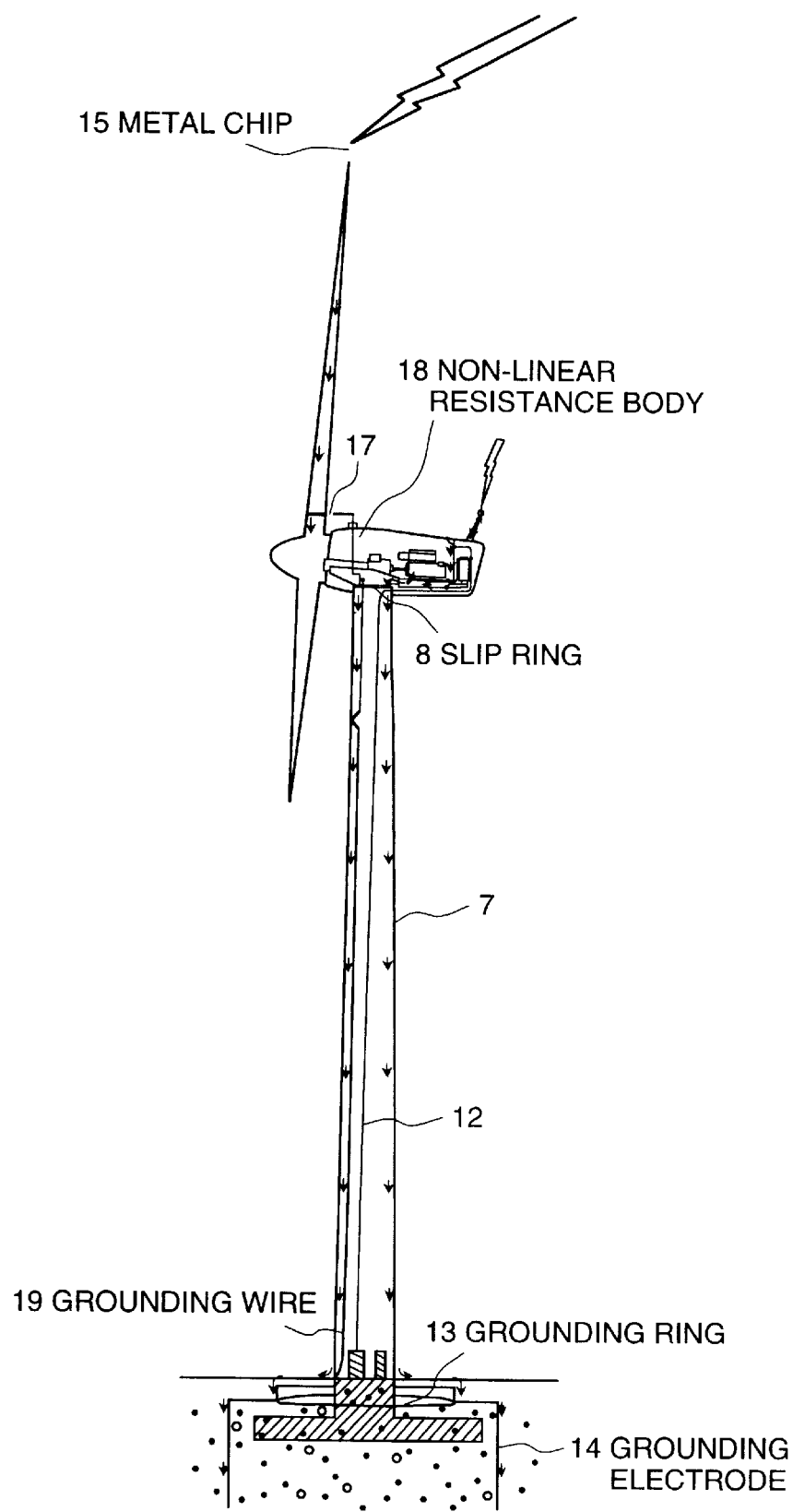
FIG. 1 is a view showing an outline of a wind power generation installation to which the present invention is applied.
Figure 2:
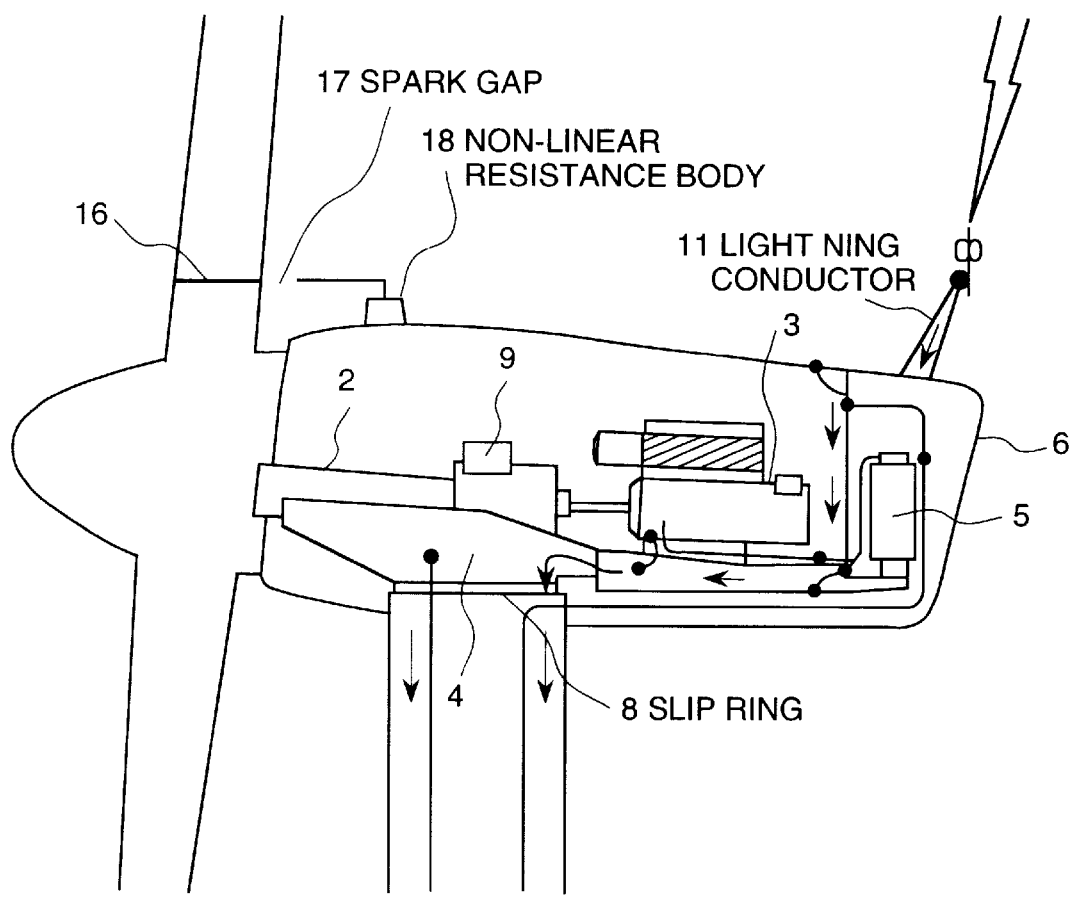
FIG. 2 shows details of a part in FIG. 1 and shows a structure of an embodiment according to the present invention.
Figure 3:
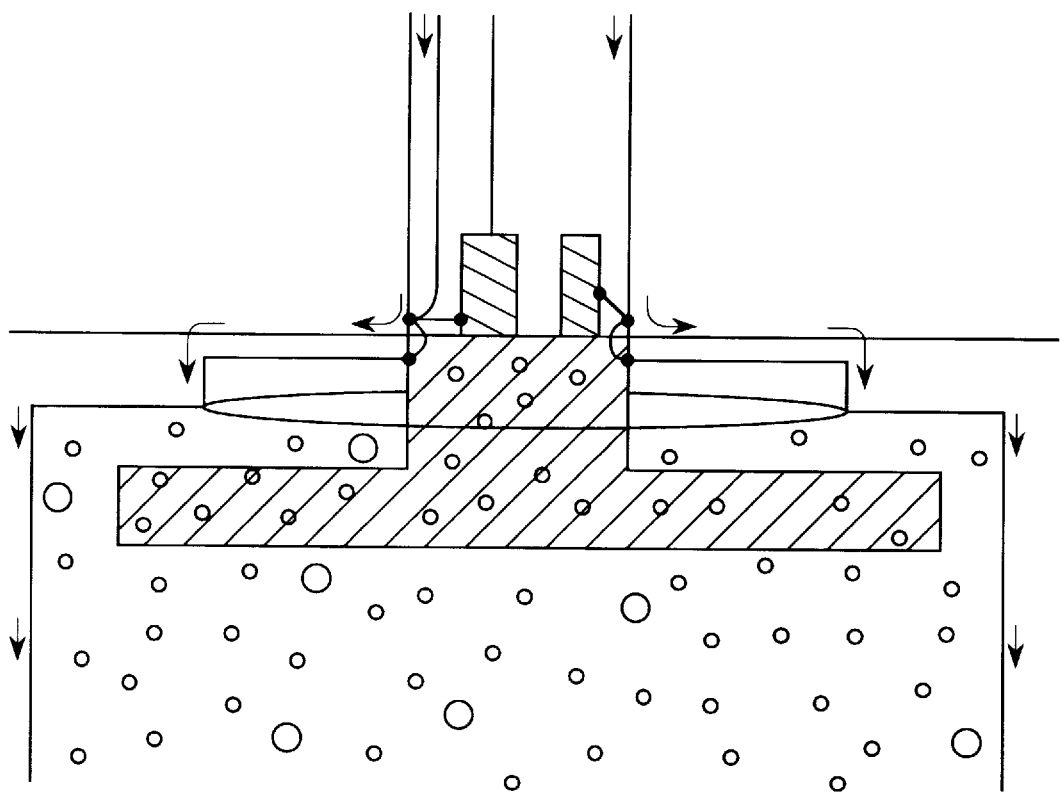
FIG. 3 shows details of another part in FIG. 1.

FIG. 1 is an overall schematic diagram of a wind power generation installation to which a lightning protection system of the present invention is applied, FIG. 2 is an enlarged view of a nacelle portion in FIG. 1, and FIG. 3 shows an enlarged view of a base portion in FIG. 1.

In these drawings, the wind power generation installation is constituted by vanes 1 constituting wind mills, a rotor shaft 2 for supporting the vanes 1, a speed increasing gear 9 directly coupled to the rotor shaft 2, a generator 3 which is rotated by the speed increasing gear 9 and generates electric power, a bearing device 4 for the rotor shaft 2, a generator control unit 5, a rotor casing 6 incorporating the rotor shaft 2, the generator 3, the bearing device 4 and the generator control unit 5, a steel tower 7 reinforced therearound by a concrete and a slip ring 8 provided between the rotor casing 6 and the steel tower 7, of which structure itself is already known.

Further, on the rotor casing 6 a lightning conductor 11 is provided, which is connected to a grounding ring 13 via a grounding wire 12 provided in the rotor casing 6 and the support column 7, and then connected to a grounding electrode 14 via the grounding ring 13. This structure is also common and is well known.

The vanes 1 are made of aluminum serving as a low resistance conductor, at the top ends thereof a metal chip 15 is provided and at the root portions thereof near the rotor casing 6 a conductor ring 16 is provided.

On the rotor casing 6, while facing the vanes 1, namely facing the conductor ring 16, a non-linear resistance body 18 such as a zinc oxide element is provided with a gap 17.

The zinc oxide element 18 is connected to the grounding ring 13 via the grounding wire 12.

Figure 4A:
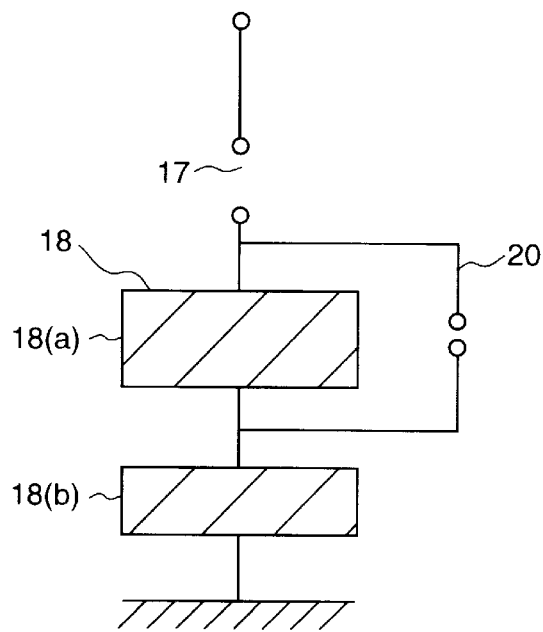
FIGS. 4A through 4D are diagrams showing examples when a zinc oxide type lightning arrester is used in the present invention.
Figure 4B:
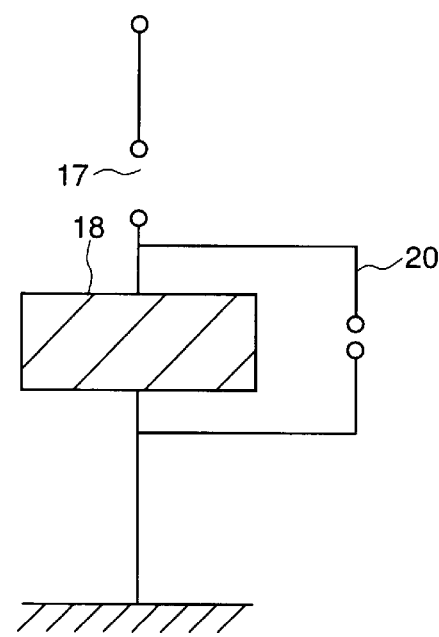
Figure 4C:
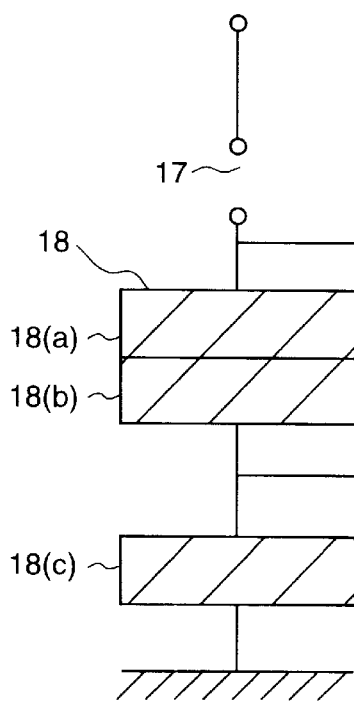
Figure 4D:
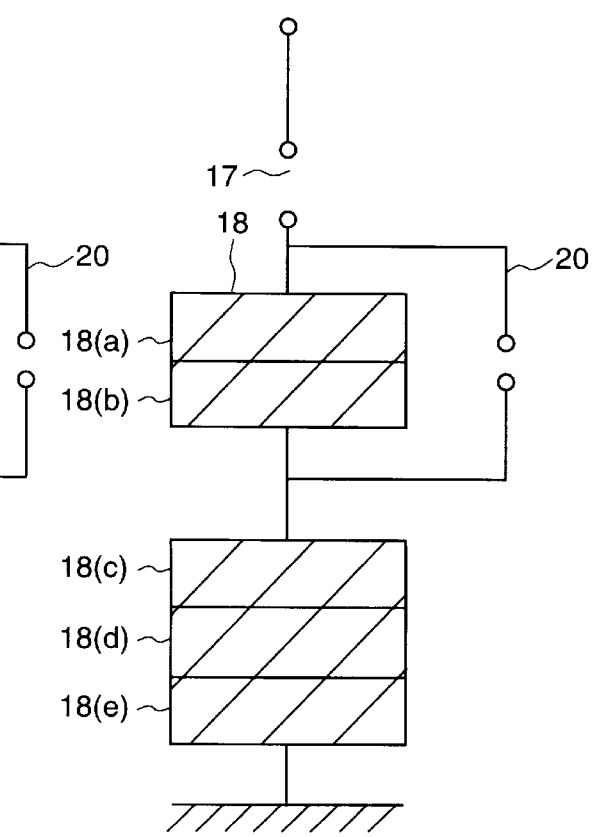

FIGS. 4A through 4D show ways of arrangement of a zinc oxide element 18. In FIG. 4A, at the down stream of the gap 17 two zinc oxide elements 18(*a*) and 18(*b*) are provided in series and a discharge gap circuit 20 which is in parallel with the zinc oxide element 18(*a*) is also provided. In FIG. 4B, a single zinc oxide element 18 is provided and in parallel therewith the discharge gap circuit 20 is provided. In FIG. 4C, three zinc oxide elements 18(*a*), 18(*b*) and 18(*c*) are provided in series and the discharge gap circuit 20 is provided in parallel with the zinc oxide elements 18(*a*) and 18(*b*). In FIG. 4D, five zinc oxide elements 18(*a*), 18(*b*), 18(*c*), 18(*d*) and 18(*e*) are provided in series and the discharge gap circuit 20 is provided in parallel with the zinc oxide elements 18(*a*) and 18(*b*).

A lightning impulse current flows from the metal chip 15 to the vanes 1 and is discharged to the ground via the gap 17 and the zinc oxide element 18 provided on the rotor casing 6 to thereby limit the abnormal voltage induced thereby. Then, when the voltage restores to a normal state, the discharge is immediately stopped and the insulation property therebetween is restored to the original state. Therefore, if a large lightning impulse current flows in winter season, the zinc oxide element 18 limits the abnormal voltage and prevents electronic parts from being damaged as has been explained above.

Figure 5:
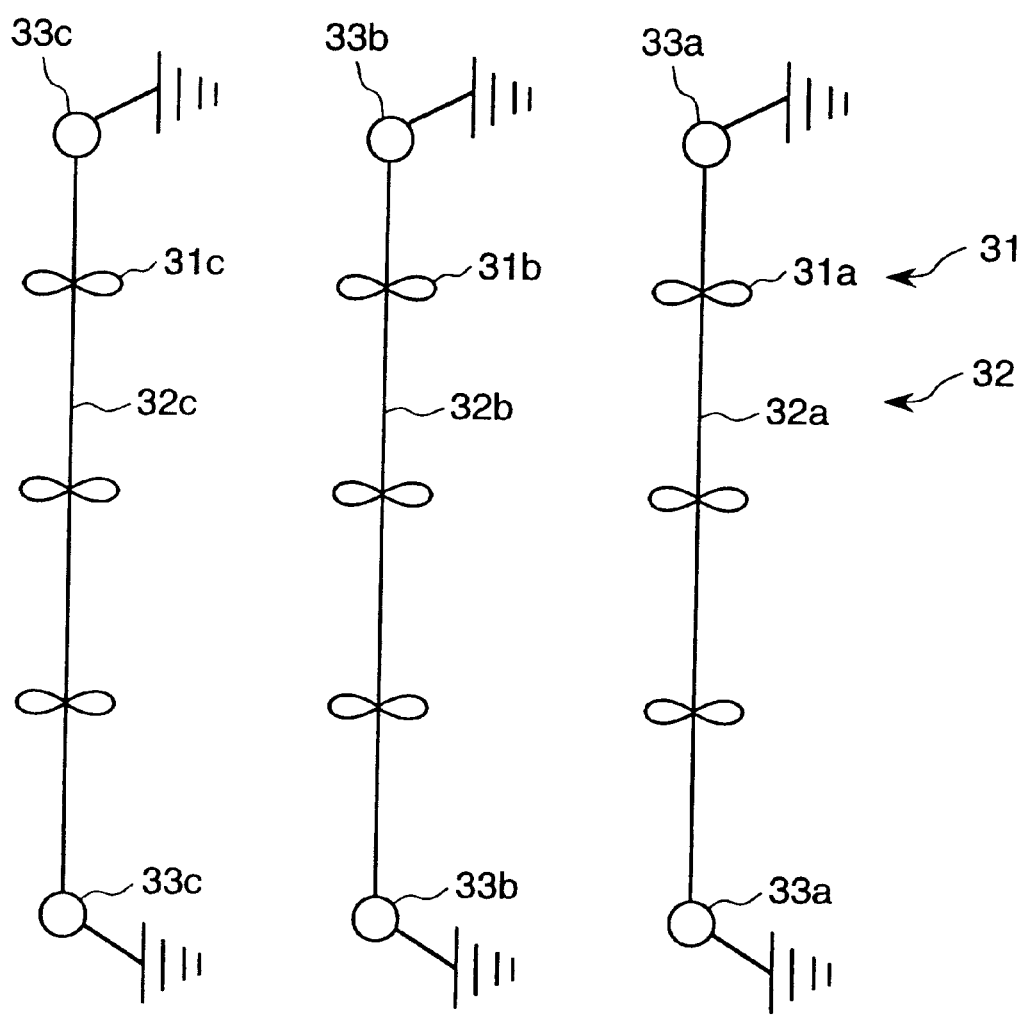
FIG. 5 is an entire arrangement diagram of another embodiment according to the present invention.
Figure 6:
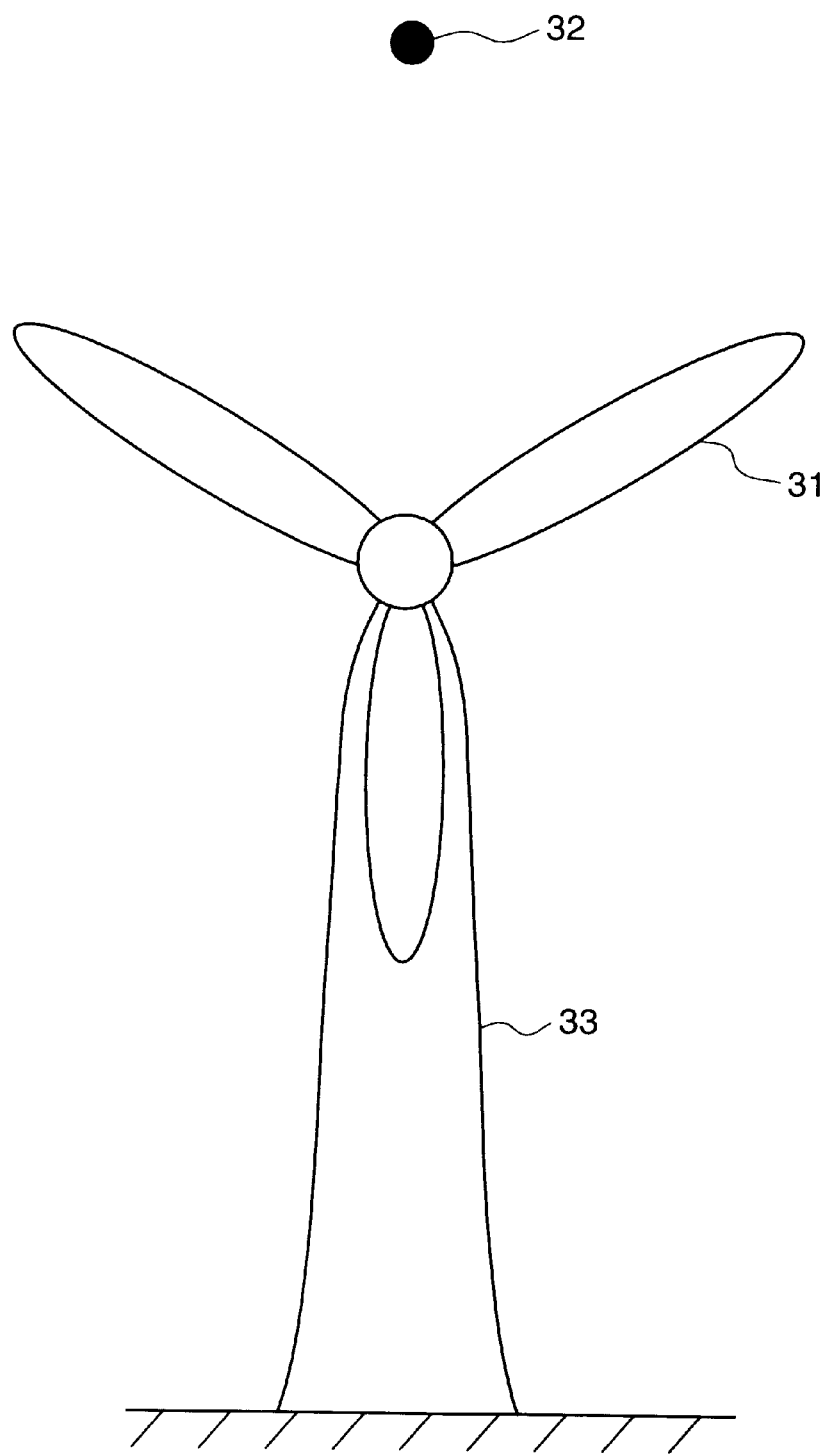
FIG. 6 shows details of a part in FIG. 5.

FIGS. 5 and 6 shows another embodiment according to the present invention.

FIG. 5 shows an entire arrangement of the embodiment. In the present embodiment as shown, nine (=3×3) wind mills 31 (31*a*, 31*b* and 31*c*) are regularly arranged in longitudinal and lateral directions each with three wind mills. It is possible to arrange regularly a plurality of wind mills in either longitudinal or lateral direction. In these arrangements, over the wind mills arranged regularly lightning conductors 32 (32*a*, 32*b* and 32*c*) are arranged. FIG. 6 shows an arrangement of a lightning conductor seen from the longitudinal side of FIG. 5.

In FIG. 5, the lightning conductors 32 are supported at both ends thereof by steel towers 33*a*, 33*b* and 33*c* and are grounded.

It is preferable in view of cost reduction to provide a single lightning conductor 32 over the wind mills 31 arranged regularly along a single line. However, the function of lightning arrester can be fulfilled, if one or a plurality of lightning conductors are arranged over a plurality of wind mills aligned along a single line and are grounded via the steel towers.

As has been explained above, according to the present invention, for lightning in winter season which causes a large current for a long duration time, as well as lightning in summer season in which generation of an abnormal voltage is limited, damage of the wind power generation device (in particular, to electronic parts used therein) can be prevented.

Further, as has been explained in connection with the second embodiment, through the provision of the lightning conductor over the plurality of wind mills, the wind mills are protected against lightnings without providing respective lightning arrester elements for each of the wind mills.

What is claimed is:

1. A lightning protection system provided at a wind power generator in which wind mill vanes are rotated by wind force and electric power is generated by making use of the rotating force thereof, wherein at a rotor casing incorporating the wind power generator a non-linear resistance body is provided so as to face the wind mill vanes.

2. A lightning protection system provided at a wind power generator in which wind mill vanes are rotated by wind force and electric power is generated by making use of the rotating force thereof, wherein a conductor ring is provided on the wind mill vanes, and a non-linear resistance body is provided at a rotor casing incorporating the wind power generator so as to face the conductor ring with a gap.

3. A lightning protection system provided at a wind power generator in which wind mill vanes are rotated by wind force and electric power is generated by making use of the rotating force thereof, wherein at a rotor casing incorporating the wind power generator, a zinc oxide type lightning arrester element is provided so as to face the wind mill vanes.

4. A lightning protection system provided at a wind power generator in which wind mill vanes are rotated by wind force and electric power is generated by making use of the rotating force thereof, wherein a conductor ring is provided on the wind mill vanes, and a zinc oxide type lightning arrester element is provided at a rotor casing incorporating the wind power generator so as to face the conductor ring with a gap.

5. A lightning protection system provided at a wind power generator in which wind mill vanes are rotated by wind force and electric power is generated by making use of the rotating force thereof, wherein, over a plurality of wind mills arranged in an array, a lightning conductor is stretched and is earthed to the ground.

\* \* \* \* \*